United States Patent [19]

Ohashi et al.

[11] Patent Number: 5,698,656

[45] Date of Patent: Dec. 16, 1997

[54] MOISTURE-CURING URETHANE ADHESIVE COMPOSITION

[75] Inventors: Yoshinobu Ohashi; Hideyuki Matsuda; Eiji Nishi; Tsuyoshi Nishida, all of Hiratsuka, Japan

[73] Assignee: The Yokohama Rubber Co., Ltd., Tokyo, Japan

[21] Appl. No.: 554,711

[22] Filed: Nov. 7, 1995

[30] Foreign Application Priority Data

Dec. 7, 1994 [JP] Japan .................. 6-303779
Dec. 20, 1994 [JP] Japan .................. 6-317127

[51] Int. Cl.$^6$ .................. C09J 175/06; C09J 175/08; C08G 18/12; C08G 18/30
[52] U.S. Cl. .................. 528/49; 525/457; 525/458; 528/45; 528/59; 528/67; 528/77; 528/80; 528/905
[58] Field of Search .................. 525/457, 458; 528/45, 49, 59, 67, 77, 80, 905

[56] References Cited

U.S. PATENT DOCUMENTS

| | | | |
|---|---|---|---|
| 4,083,815 | 4/1978 | Thompson | 524/290 |
| 4,293,679 | 10/1981 | Cogliano | 528/48 |
| 4,690,954 | 9/1987 | Wampfler et al. | 521/107 |
| 4,957,959 | 9/1990 | Matsumoto et al. | 524/196 |
| 5,115,071 | 5/1992 | Quay et al. | 528/59 |
| 5,155,180 | 10/1992 | Takada et al. | 525/440 |
| 5,173,538 | 12/1992 | Gilch et al. | 525/130 |
| 5,367,036 | 11/1994 | Saito et al. | 525/458 |
| 5,536,805 | 7/1996 | Kangas | 528/59 |
| 5,631,318 | 5/1997 | Ito et al. | 524/590 |

FOREIGN PATENT DOCUMENTS

| | | |
|---|---|---|
| 2-32189 | 2/1990 | Japan . |
| 2-182774 | 7/1990 | Japan . |
| 3-59084 | 3/1991 | Japan . |
| 5-171035 | 7/1993 | Japan . |
| 6-88067 | 3/1994 | Japan . |

*Primary Examiner*—Rabon Sergent
*Attorney, Agent, or Firm*—Finnegan, Henderson, Farabow, Garrett & Dunner

[57] ABSTRACT

A moisture-curing urethane adhesive composition of a urethane prepolymer resulting from the reaction of a mixture of a polyether diol and a polyether triol with a diisocyanate compound, and a polyurethane compound resulting from the reaction of a mixture of a polyester polyol and a polypropyleneether polyol with a hexamethylene diisocyanate compound with addition of a monoalcohol. A modified moisture-curing urethane adhesive composition of a urethane prepolymer resulting from the reaction of a mixture of a polyether diol and a polyether triol with a diisocyanate compound, a first polyurethane compound resulting from the reaction of a copolymeric polyol consisting of propylene oxide and ε-caprolactone with a hexamethylene diisocyanate compound with addition of a monoalcohol, and a second polyurethane compound resulting from the reaction of a polyester polyol with a hexamethylene diisocyanate compound with addition of a monoalcohol.

2 Claims, No Drawings

MOISTURE-CURING URETHANE ADHESIVE COMPOSITION

BACKGROUND OF THE INVENTION

1. Field of the Invention

This invention relates to moisture-curing hot-melt urethane adhesive compositions and has particular reference to such an adhesive or sealant composition useful for bonding inter alia windshields in place on an automotive vehicle.

2. Prior Art

There are known various reactive hot-melt polymer compositions which are applied in the molten state to induce initial structural strength upon solidification with temperature drop and subsequently exhibit final bond strength and elasticity upon curing. These peculiar physical properties contribute to a wide range of application of such hot-melt compositions as adhesives or sealants in various sectors of the industry such as automobile, textile, wood, construction and so on. Reactive hot-melts have found most extensive use as sealants for direct glazing automobile windshields, in which instance the sealant is required to be free of sagging; i.e. initially dimensionally stable when applied and exhibit high final bond strength when cured.

As disclosed for instance in Japanese Laid-Open Patent Publication No. 2-32189, a moisture-curing hot-melt sealant is made up predominantly of a polyether polyol-based urethane prepolymer in which a polyether polyol is used in combination with a polyester polyol.

Japanese Laid-Open Patent Publication No. 3-59084 discloses a moisture-curing hot-melt adhesive comprising a block urethane prepolymer derived from reacting a diisocyanate compound with a mixture of a polyol of less than 8,000 molecular weight and a block polymer polyol resulting from the reaction of a terminal isocyanate group-containing urethane prepolymer with a thermoplastic saturated polyester polyol, the urethane prepolymer being blended with another terminal isocyanate group-containing urethane prepolymer.

Japanese Laid-Open Patent Publication No. 2-182774 discloses a fast-curing hot-melt polyurethane composition derived from blending a polyether polyol having a relatively small molecular weight and a higher glass transition point than room temperature with a urethane prepolymer having a relatively large molecular weight and a lower glass transition point than room temperature.

Japanese Laid-Open Patent Publication No. 6-88067 discloses that a sealant composition comprising a blend of a polyether polyol-based urethane prepolymer and an ester compound melting at 30°–100° C. can exhibit high initial structural strength with least moist heat deterioration.

Japanese Laid-Open Patent Publication No. 5-171035 discloses a moisture-curing urethane sealant composition comprising a urethane prepolymer blended with a urethane compound containing a polyether polyol or a polyester polyol and isocyanates with addition of a monoalcohol to hinder free isocyanate groups in the prepolymer, the resulting product being described as possessing fast setting, high initial adhesion strength and after-cure bond and elastic properties.

The prior art adhesive or sealant compositions referred to above are not entirely satisfactory because those comprising urethane prepolymers tend to become too viscous as their application temperature is rather high, while those containing hindered isocyanate materials would fail to retain final bond strength and rubber-like elasticity as desired in the cured product.

SUMMARY OF THE INVENTION

Whereas, the present invention seeks to provide a moisture-curing urethane adhesive composition which will exhibit sufficient initial structural strength in the uncured state to achieve a maximum rate of working efficiency and a high final bond strength in the cured state, or such hot-melt properties that meet the necessary requirements for inter alia direct glazing of automobile windshields.

According to a first embodiment of the invention, there is provided a moisture-curing urethane adhesive composition comprising (A) a urethane prepolymer resulting from the reaction of a mixture of a polyether diol and a polyether triol both having a number-average molecular weight of from 1,000 to 7,000 with a diisocyanate compound in an equivalent ratio of isocyanate group/hydroxyl group of between 1.1 and 2.5; and (B) a polyurethane compound resulting from the reaction of a mixture of a polyester polyol having a number-average molecular weight of from 500 to 6,000 and a polypropyleneether polyol having a number-average molecular weight of from 1,000 to 7,000 with a hexamethylene diisocyanate compound in an equivalent ratio of isocyanate group/hydroxyl group of between 1.5 and 2.5 to form an isocyanate prepolymer with addition of a monoalcohol having a carbon number of from 1 to 22 the equivalent ratio of hydroxyl groups in the monoalcohol to isocyanate groups in the isocyanate prepolymer being less than 0.9; the polyurethane compound (B) being present in an amount of from 1 to 20 parts by weight per 100 parts by weight of the urethane prepolymer (A).

According to a second embodiment of the invention, there is provided a moisture-curing urethane adhesive composition comprising (A) a urethane prepolymer resulting from the reaction of a mixture of a polyether diol and a polyether triol both having a number-average molecular weight of from 1,000 to 7,000 with a diisocyanate compound in an equivalent ratio of isocyanate group/hydroxyl group of between 1.1 and 2.5; (B') a polyurethane compound resulting from the reaction of a copolymeric polyol consisting of a blend of propylene oxide and ϵ-caprolactone, said copolymeric polyol having a number-average molecular weight of from 1,000 to 3,000 and being blended in a mole ratio of from 8/2 to 2/8, with a hexamethylene diisocyanate compound in an equivalent ratio of isocyanate group/hydroxyl group of between 1.5 and 2.5 to form an isocyanate prepolymer with addition of a monoalcohol having a carbon number of from 1 to 22 the equivalent ratio of hydroxyl groups in the monoalcohol to isocyanate groups in the isocyanate prepolymer being less than 0.9; and (C) a polyurethane compound resulting from the reaction of a polyester polyol having a number-average molecular weight of from 1,000 to 7,000 with a hexamethylene diisocyanate compound in an equivalent ratio of isocyanate group/hydroxyl group of between 1.5 and 2.5 to form an isocyanate prepolymer with addition of a monoalcohol having a carbon number of from 1 to 22 the equivalent ratio of hydroxyl groups in the monoalcohol to isocyanate groups in the isocyanate prepolymer being less than 0.9; the weight ratio of compound (B') to compound (C) being in the range of from 0.1:1 to 5:1, and the sum of compound (B') and compound (C) being in the range of from 1 to 20 parts by weight per 100 parts by weight of prepolymer (A).

DETAILED DESCRIPTION OF THE INVENTION

The moisture-curing urethane-based adhesive or sealant composition according to the first embodiment of the present invention is made up essentially of a selected urethane prepolymer (A) and a selected polyurethane compound (B) blended together in certain specified amounts.

Urethane Prepolymer (A)

This prepolymer is derivable from reacting a mixture of polyether diol and triol each having a number-average molecular weight of from 1,000 to 7,000 with a diisocyanate in an equivalent ratio of isocyanate group/hydroxyl group of between 1.1 and 2.5. The polyol mixture is obtainable from addition reaction of one or more alkylene oxides such as ethylene oxide, propylene oxide, butylene oxide, tetrahydrofuran and the like with two or more active hydrogen atom-containing compound such as polyalcohols, amines, alkanolamines and polyphenols, said polyalcohols including ethylene glycol, propylene glycol, butane diol, diethylene glycol, glycerin, hexane triol, trimethylol propane, pentaerythritol and the like, said amines including ethylene diamine, hexamethylene diamine and the like, said alkanolamines including ethanolamine, propanolamine and the like, and said polyphenols including resorcinol, bisphenol and the like. The use of such diol and triols in appropriate balanced amounts is conducive to suppressing objectionable foaming thanks to their ability to form a three-dimensional cross-linkage.

It has been found that the number-average molecular weight of each of polyether triol and polyether diol useful in the preparation of the urethane prepolymer (A) should be in the range of 1,000–7,000, failing this would result in a prepolymer being too viscous with number-average molecular weights smaller than 1,000 and in a resultant composition being degraded in after-cure bond strength with molecular weights larger than 7,000. The mole ratio of polyether triol to polyether diol is preferably in the range of from 1:3 to 3:1 to provide satisfactory viscosity, curing and final product properties.

The diisocyanate compound used as a co-reactant in the preparation of the urethane prepolymer (A) may be chosen from those commonly accepted for the manufacture of urethane resins. Specific examples include 2,4-tolylene diisocyanate, 2,6-tolylene diisocyanate, phenylene diisocyanate, xylene diisocyanate, diphenylmethane-4,4'-diisocyanate, naphthalene-1,5-diisocyanate and hydrogenates thereof, ethylene diisocyanate, propylene diisocyanate, tetramethylene diisocyanate, hexamethylene diisocyanate, isophorone diisocyanate, 1-methyl-2,4-diisocyanate cyclohexane, 1-methyl-2,6-diisocyanate cyclohexane, dicyclohedxthylmethane diisocyanate, triphenylmethane triisocyanate and the like. These compounds may be used alone or in combination.

The polyether polyol is reacted with the diisocyanate compound in an equivalent ratio of isocyanate group to hydroxyl group of 1.1 to 2.5. Smaller ratios would render prepolymer (A) too viscous to warrant practical application. Greater ratios would leave much polyisocyanate compound unreacted, causing insufficient resistance to foaming during sealant formulation. Though not specifically restricted, the reaction may be effected in conventional manner, for example, at a temperature of about 50° to 100° C. and under atmospheric pressure and if necessary with use of a urethanation catalyst such as a tin or bismuth compound of an organic class.

Polyurethane Compound (B)

This compound is derivable from reacting a mixture of polyether polyol having a number-average molecular weight of from 500 to 6,000 and a polypropyleneether polyol having a number-average molecular weight of from 1,000 to 7,000 with a hexamethylene diisocyanate compound in an equivalent ratio of isocyanate group/hydroxyl group of between 1.5 and 2.5 to produce a urethane or isocyanate prepolymer followed by the addition of a monoalcohol having a carbon number of from 1 to 22 in an equivalent ratio of hydroxyl group/isocyanate group of less than 0.9.

The polyester polyol useful in the preparation of the urethane prepolymer may be a polycondensate of a polybasic acid such as a dibasic acid with a polyhydroxyl compound such as a glycol. Suitable polybasic acids include adipic acid, sebacic acid, phthalic acid, maleic acid, glutaric acid and the like. Polyhydroxyl compounds typically include ethylene glycol, diethylene glycol, butylene glycol, neopentyl glycol, hexane glycol, trimethylol propane, glycerine pentaerythritol and the like. Polyester polyols other than the polycondensate may be suitably used such as a polycarbonate polyol having two alkylene groups bonded side by side via a carbonate linkage and a lactone-type polyester polyol obtained by ring open polymerization of a monomeric caprolactone. The polyester polyol has a number-average molecular weight of 500 to 6,000. Smaller than 500 molecular weights would lead to increased crystallinity and higher melting point of the resultant product. Larger than 6,000 molecular weights would result in reduced adhesion to a substrate.

The propyleneether polyol referred to hereunder includes a polyol such as diols and triols that may be derived from the addition reaction of propylene oxide with a compound having two or more active hydrogen atoms, this compound being the same as used in the preparation of the polyether polyol in the urethane prepolymer (A). Number-average molecular weights of these polyols if smaller than 1,000 would lead to objectionably high viscosity of the resultant prepolymer and if larger than 7,000 would retard crystallization of the reaction product and lose the initial structural strength. The polypropyleneether polyol is chosen in the invention so as to maintain compatibility with the urethane prepolymer (A).

The mole ratio of polyester polyol to polypropyleneether polyol is in the range of 1:1 to 10:1, preferably 2:1 to 5:1. Ratios less than 1 would fail to achieve appropriate initial structural strength and greater than 10 would result in reduced dispersability of the polyester in the urethane compound (B), leading to reduced bonding strength.

The choice of hexamethylene diisocyanate (HDI) for use in the preparation of the urethane or isocyanate prepolymer is attributed to its contribution to improved initial structural strength of the inventive hot-melt adhesive composition.

The equivalent ratio of isocyanate groups in the hexamethylene diisocyanate compound to hydroxyl groups in the polyols is selected to be in the range of from 1.5 to 2.5. Ratios smaller than 1.5 would lead to excessive viscosity and hence less compatibility with the co-reactant urethane prepolymer (A), while ratios greater than 2.5 would result in retarded crystallization and loss of the initial structural strength, a cause for sagged coat.

The polyurethane compound (B) results from the reaction of the urethane or isocyanate prepolymer with such a monoalcohol which is capable of hindering at least part of the isocyanate groups in the diisocyanate compound.

Monoalcohols eligible for the purpose of the invention include straight or branched chain, saturated or unsaturated monoalcohols. Preferred examples are straight-chain saturated alcohols of 2–12 carbon atoms such as methanol, ethanol, butanol, isobutanol, propanol, pentanol, hexanol, heptanol, octanol, stearyl alcohol, benzyl alcohol, 2-hydroxymethyl-methacrylate and the like. The equivalent ratio of hydroxyl groups in the monoalcohol to isocyanate groups in the urethane or isocyanate prepolymer is less than 0.9, preferably in the range of from 0.1 to 0.5. Ratios greater than 0.9 would result in reduced bond strength.

The reaction for hindering or eliminating free isocyanates in the formulation of the polyurethane compound (B) may be similar to that of urethanation effected at a temperature of 50°–100° C. under atmospheric pressure.

The polyurethane compound (B) is used in an amount of 1–20 parts by weight per 100 parts by weight of the urethane prepolymer (A). Amounts smaller than 1 weight part would fail to develop the requisite initial structural strength, while amounts larger than 20 weight parts would result in reduced bond strength and degraded rubber-like property of the adhesive composition in the cured state.

In the practice of the invention, there may be used various additives commonly known in the art which include plasticizers, fillers, thixotropic agents, tackifiers, catalysts, ultraviolet absorbers, dyes, pigments, flame retardants and the like. Typical plasticizers are chosen from derivatives of benzoic acid, phthalic acid, trimellitic acid, pyromellitic acid, adipic acid, sebacic acid, fumaric acid, maleic acid, itaconic acid and citric acid and of polyester, polyether and epoxy and the like. Suitable fillers are silicic acid derivatives, talc, metallic powder, calcium carbonate, clay, carbon black and the like. Thixotropic agents typically include benton, anhydrous silicic acid, urea derivatives and the like. Eligible catalysts include dibutyltin dilaurate, dioctyltin dilaurate, zinc octylate, organic bismuth compounds, triethyldiamine, amine compounds such as morpholine amine and the like.

A preferred formulation of the inventive hot-melt sealant according to the first embodiment of the invention exemplarily comprises 1–20 parts by weight of the polyurethane compound (B) per 100 parts by weight of the urethane prepolymer (A), less than 20 percent by weight of a plasticizer, less than 60 percent by weight of a filler and less than 3 percent by weight of other additives, the amounts of the urethane prepolymer (A) and the polyurethane compound (B) being 20–70 percent by weight and less than 14 percent by weight, respectively, based on total composition.

The adhesive or sealant composition according to the invention may be prepared exemplarily by the process in which the urethane prepolymer (A) and the polyurethane compound (B) are introduced into a kneader loaded with nitrogen gas, followed by the addition of plasticizers, fillers and other additives as deemed necessary or desirable, the whole being kneaded sufficiently in vacuum and kneading is continued with the addition of a catalyst if necessary.

The resulting composition in the molten state may be applied per se to a substrate, or alternatively taken into a suitable container, cooled and sealed for storage. The thus stored composition can be melted with heat to be readily applied to a desired substrate. When installing a windshield in a car, the sealant composition is coatable at about 50°–60° C. over either or both of the glass pane and the window frame and allowed to cool and harden, retaining sufficient structural strength to avoid sagging and finally cured upon exposure to environmental moisture, exhibiting the required bond strength and elasticity.

The invention will be further described by way of the following examples.

INVENTIVE EXAMPLES 1–11 and
COMPARATIVE EXAMPLES 1–6

The formulations and property test results of several inventive sealants and some controls are shown in Table 1 and Table 2, respectively.

For purposes of illustration, the viscosity of the composition in Inventive Example 2 was 1,410 poise (Ps) at 20° C. and 230 Ps at 60° C.; that in Inventive Example 4 was 1,630 Ps at 20° C. and 250 Ps at 60° C.; that in Inventive Example 6 was 1,320 Ps at 20° C. and 220 Ps at 60° C.; and that in Comparative Example 4 was 600 Ps at 20° C. and 210 Ps at 60° C.

Preparation of Urethane Prepolymer (A)

57 parts by weight of a polyoxypropylene triol having three hydroxyl groups and an average molecular weight of 5,000 and 23 parts by weight of a polypropyleneether diol having two hydroxyl groups and an average molecular weight of 2,000 were charged into a reactor and subjected to dehydration at 110° C. and under 50 mmHg for two hours. The admixture was then cooled, followed by the addition of 9.1 parts by weight of a mixture of 2,4-tolylenediisocyanate and 2,6-tolylenediisocyanate (80:20) with stirring. The reaction was continued until free isocyanates were held to 2.2%, thereby providing a toluene diisocyanate (TDI) prepolymer. This prepolymer was stirred together with 19.6 parts by weight of diphenylmethane-4,4'-diisocyanate, followed by the addition of 85 parts by weight of prehydrated polyoxypropylene triol having an average molecular weight of 5,000 and 35 parts by weight of a polypropyleneether diol having an average molecular weight of 2,000. The reaction was continued at 80° C. until free isocyanates were diminished to 1.8%, thereby providing a 4,4'-diphenylmethane diisocyanate (MDI) prepolymer.

Preparation of Polyurethane Compound (B)

Polycaprolactone polyol having an average molecular weight of 3,000 and polypropyleneether polyol having an average molecular weight of 2,000 were taken in the tabulated mole ratio and quantity into a reactor and subjected to dehydration at 110° C. and under 50 mmHg for two hours. The admixture was cooled to 80° C., followed by the addition with stirring of hexadimethylene diisocyanate of the tabulated mole ratio. The mixture was further added with ethanol of the tabulated mole ratio, and the reaction was continued until all free isocyanates were substantially hindered.

Preparation of Moisture-Curing Sealant Composition

A nitrogen-filled kneader was charged with 100 parts by weight of each urethane prepolymer (A) and tabulated parts by weight of each polyurethane compound (B), followed by the addition of 20 weight parts dehydrated plasticizer (triethyl trimellitate), 100 weight parts dry carbonblack and 10 weight parts dry calcium carbonate. Sufficient kneading was continued in vacuum with the addition of 1.7 weight parts 50% dioctylphthalate solution of dioctyl-tin-laurate.

Initial Structural Strength Test

The various tabulated sealant compositions were tested for tensile strength by disposing each test sample at a temperature of 20° C. and a relative humidity of 65% and for a period of 10 minutes, the test sample having been warmed to 60° C. and coated over a glass substrate and squeezed between a pair of glass plates to a bond thickness of 6 mm.

Final Bond Strength Test

Each of the tabulated compositions was applied over a primer-coated sheet of glass and over a primer-coated sheet of steel, respectively, to a coat thickness of 3 mm and disposed at a temperature of 20° C. and a relative humidity of 65% for a period of 7 consecutive days. Test samples were each tested for material breakage and surface peel by observing tensile break behavior along knife-cut lines.

The moisture-curing urethane adhesive or sealant composition according to the second embodiment of the invention is made up essentially of a urethane prepolymer (A) and two different polyurethane compounds (B') and (C).

Urethane Prepolymer (A)

This is the same as used in the first embodiment of the invention.

Polyurethane Compound (B')

This is a polyurethane compound resulting from the reaction of a copolymeric polyol consisting of propylene oxide and ε-caprolactone and having a number-average molecular weight of from 1,000 to 3,000 and being blended in a mole ratio of from 8/2 to 2/8 with a hexamethylene diisocyanate compound in an equivalent ratio of isocyanate group/hydroxyl group of between 1.5 and 2.5 with addition of a monoalcohol having a carbon number of from 1 to 22 in an equivalent ratio of hydroxyl group/isocyanate group of less than 0.9.

Smaller number-average molecular weights than 1,000 would render the resultant urethane compound too viscous for normal application, while larger molecular weights 3,000 would result in inadequate initial structural strength of the resultant sealant.

The propylene oxide/ε-caprolactone copolymer used in the invention may be prepared by any known processes, for example by addition polymerization in the presence of a polymerization initiator such as of KOH and in a propylene unit/pentaoxy unit mole ratio of from 8/2 to 2/8, preferably from 7/3 to 3/7. Propylene units if exceeding 8/2 would fail to induce initial structural strength of the adhesive composition and if smaller than 2/8 would lead to declined adhesive bond strength.

The use of the polyurethane compound (B') in the inventive composition is intended to enhance the compatibility of the urethane prepolymer (A) with the polyurethane compound (C) thereby achieving a good balance between initial structural strength and adhesive strength.

In the preparation of polyurethane compound (B') in a manner similar to urethane prepolymer production at a reaction temperature of about 50°–100° C. under atmospheric pressure in the presence of a suitable urethanation catalyst, the copolymeric polyol is reacted with hexamethylene diisocyanate to form an isocoyanate prepolymer in such a ratio that the equivalent ratio of hydroxyl groups in the polyether polyol to isocyanate groups in the polyisocyanate compound can be held in the range of between 1.1 and 2.5. Smaller ratios than 1.1 would lead to objectionably high viscosity and hence declined compatibility with the urethane prepolymer (A), while greater ratios than 2.5 would result in retarded crystallization and failed initial structural strength.

The polyurethane compound (B') results from the subsequent reaction of the isocyanate prepolymer with a monoalcohol such as those previously identified to hinder at least part of the isocyanate groups.

Polyurethane Compound (C)

This is a polyurethane compound resulting from the reaction of a polyester polyol having a number-average molecular weight of from 1,000 to 7,000 with a hexamethylene diisocyanate compound in an equivalent ratio of isocyanate group/hydroxyl group of between 1.5 and 2.5 with addition of a monoalcohol having a carbon number of from 1 to 22 in an equilavent ratio of hydroxyl group/isocyanate group of less than 0.9.

The polyester polyol used herein is the same as those already recited in connection with the preparation of polyurethane compound (B) according to the first embodiment of the invention.

The polyester polyol is reacted with hexamethylene diisocyanate in the same ratio as specified for the preparation of the polyurethane compound (B) and thereafter with a monoalcohol in a manner similar to compound (B).

The total amount of compound (B') and compound (C) is generally in the range of from 1 to 20 parts by weight, preferably from 3 to 10 parts by weight per 100 parts by weight of the urethane prepolymer (A). Less than 1 part by weight would fail in the requisite initial structural strength, while more than 20 parts by weight would lead to declined adhesiveness and deteriorated rubbery elasticity in the final cured state of the adhesive or sealant composition.

The weight ratio of compound (B') to compound (C) is generally in the range of 0.1:1 to 5:1, preferably 0.2:1 to 1:1. Ratios smaller than 0.1:1 would fail in adhesive strength, while ratios greater than 5:1 would lose initial structural strength.

There may be used various additives such as those already recited in connection with the first embodiment of the invention.

The procedures for the preparation of the moisture-curing urethane sealant composition obtained in the second embodiment and for the application thereof to a substrate such as an automobile windshield are similar to those already described in connection with the first embodiment.

INVENTIVE EXAMPLES 12–22 AND COMPARATIVE EXAMPLES 7–11

Preparation of Urethane Prepolymer (A)

The procedure of the first embodiment of the invention was followed.

Preparation of Polyurethane Compound (B')

(1) Polyurethane Compound (B'-1)

A polymeric polyol having a molecular weight of 2,000 and resulting from the reaction of one mole of propylene oxide and one mole of ε-caprolactone was added while being stirred with hexadimethylene diisocyanate and reacted in an isocyanate (NCO)/hydroxyl mole ratio of two, followed by the addition of ethanol thereby hindering 70% of free or residual isocyanate.

(2) Polyurethane Compound (B'-2)

The procedure for polyurethane compound (B'-1) was followed except that 7 moles of ε-caprolactone and 3 moles of propylene oxide were used.

(3) Polyurethane Compound (B'-3)

The procedure for polyurethane compound (B'-1) was followed except for the use of 3 moles of ε-caprolactone and 7 moles of propylene oxide.

(4) Polyurethane Compound (B'-4)

The procedure for polyurethane compound (B'-1) was followed except that ethanol was added to hold hinderance of free isocyanate to 10% in the resultant product.

(5) Polyurethane Compound (B'-5)

The procedure for polyurethane compound (B'-1) was followed except that ethanol was added until substantially all free isocyanate was hindered.

Preparation of Polyurethane Compound (C)

(1) Polyurethane Compound (C-1)

A polycaprolactone polyol having a molecular weight of 3,000 was added while being stirred with hexadimethylene diisocyanate in an isocyanate/hydroxyl mole ratio of two, followed by the addition of hexanol thereby obtaining 70% hindered isocyanate.

(2) Polyurethane Compound (C-2)

The procedure for polyurethane compound (C-1) was followed except that ethanol was used in place of hexanol.

(3) Polyurethane Compound (C-3)

The procedure for polyurethane compound (C-1) was followed except that there was obtained 10% hindered isocyanate in the resultant product.

(4) Polyurethane Compound (C-4)

The procedure for polyurethane compound (C-1) was followed except that substantially all isocyanate was hindered.

Preparation of Moisture-Curing Sealant Composition

A procedure similar to that employed in the preparation of a sealant composition according to the first embodiment herein above described was followed in producing a moisture-curing sealant composition comprising polyurethane compounds (B') and (C) in the respective amounts indicated in Tables 3 and 4 per 100 parts by weight of urethane prepolymer (A). The resultant compositions each were tested with the results also shown in Tables 3 and 4.

TABLE 1

| | Inventive Examples | | | | | | | | | | |
|---|---|---|---|---|---|---|---|---|---|---|---|
| | 1 | 2 | 3 | 4 | 5 | 6 | 7 | 8 | 9 | 10 | 11 |
| Urethane prepolymer (A), weight parts | 100 | 100 | 100 | 100 | 100 | 100 | 100 | 100 | 100 | 100 | 100 |
| Polyurethane Compound (B): | | | | | | | | | | | |
| PCL*[1]/PPO*[2] mole ratio | 0.5/0.5 | 0.7/0.3 | 0.7/0.3 | 0.7/0.3 | 0.8/0.2 | 0.9/0.1 | 0.7/0.3 | 0.7/0.3 | 0.7/0.3 | 0.7/0.3 | 0.7/0.3 |
| HDI*[3], moles per mole polyol | 2 | 1.5 | 2 | 2 | 2 | 2 | 2 | 2 | 2 | 2 | 2 |
| EtOH*[4], moles per mole HDI | 0.25 | 0.25 | 0.25 | | 0.25 | 0.25 | 0 | 0.5 | 0.25 | 0.25 | 0.25 |
| StOH*[5], moles per mole HDI | | | | 0.1 | | | | | | | |
| Polyurethane compound (B), weight parts | 7 | 7 | 7 | 7 | 7 | 7 | 7 | 7 | 3 | 5 | 15 |
| Property Test: | | | | | | | | | | | |
| Initial stemgth (kg/cm$^2$) | 0.15 | 0.32 | 0.30 | 0.36 | 0.35 | 0.39 | 0.31 | 0.32 | 0.15 | 0.28 | 0.55 |
| Final bond strength | CF*[6] | CF | CF | CF | CF | CF | CF | CF | CF | CF | CF |

Note:
*[1]polycaprolactone polyol
*[2]polypropyleneether polyol
*[3]hexamethylene diisocyanate
*[4]ethanol
*[5]stearyl alcohol
*[6]material breakage

TABLE 2

| | Comparative Examples | | | | | |
|---|---|---|---|---|---|---|
| | 1 | 2 | 3 | 4 | 5 | 6 |
| Urethane prepolymer (A), weight parts | 100 | 100 | 100 | 100 | 100 | 100 |
| Polyurethane compound (B): | | | | | | |
| PCL*[1]/PPO*[2] mole ratio | 0.95/0.05 | 0.1/0.9 | | | 0.7/0.3 | 0.7/0.3 |
| PCL*[1], mole ratio | | | 1.0 | | | |
| Diol, mole ratio | | | | 1.0 | | |
| HDI*[3], moles per mole polyol | 2 | 2 | 2 | 2 | 2 | 2 |
| EtOH*[4], moles per mole HDI | 0.25 | 0.25 | 0.25 | 0.25 | 0.25 | 0.25 |
| Polyurethane compound (B), weight parts | 7 | 7 | 7 | 7 | 25 | 7 |
| Property Test: | | | | | | |
| Initial strength (kg/cm$^2$) | 0.35 | 0.07 | 0.36 | 0.06 | 0.61 | 0.32 |
| Final bond strength | PS*[7] | CF*[6] | PS | CF | PS | 20% PS 80% CF |

Note:
*[1]polycaprolactone polyol
*[2]polypropyleneether polyol
*[3]hexamethylene diisocyanate
*[4]ethanol
*[5]stearyl alcohol
*[6]material breakage
*[7]surface peel

TABLE 3

| | Inventive Examples | | | | | | | | | | |
|---|---|---|---|---|---|---|---|---|---|---|---|
| | 12 | 13 | 14 | 15 | 16 | 17 | 18 | 19 | 20 | 21 | 22 |
| Urethane Prepolymer (A), weight parts | 100 | 100 | 100 | 100 | 100 | 100 | 100 | 100 | 100 | 100 | 100 |
| Polyurethane compounds (B') and (C), weight parts: | | | | | | | | | | | |
| B-1 | 5 | 4 | 3 | 4 | 3 | 2 | 1 | | | | 3 |
| B-2 | | | | | | | | 3 | | | |
| B-3 | | | | | | | | | 3 | | |
| B-4 | | | | | | | | | | 3 | |
| C-1 | 3 | 4 | 5 | 8 | 6 | 4 | 2 | 5 | 5 | | |
| C-2 | | | | | | | | | | | 5 |
| C-3 | | | | | | | | | | 5 | |
| Property Test: | | | | | | | | | | | |
| Initial strength (kg/cm$^2$) | 0.21 | 0.24 | 0.32 | 0.44 | 0.40 | 0.20 | 0.15 | 0.41 | 0.25 | 0.30 | 0.29 |
| Final bond strength | CF*6 | CF | CF | CF | CF | CF | CF | CF | CF | CF | CF |

Note:
*6material breakage

TABLE 4

| | Comparative Examples | | | | |
|---|---|---|---|---|---|
| | 7 | 8 | 9 | 10 | 11 |
| Urethane prepolymer (A), weight parts | 100 | 100 | 100 | 100 | |
| Polyurethane compounds (B') and (C), weight parts: | | | | | |
| B-1 | | 15 | 8 | | |
| B-2 | | | | | |
| B-3 | | | | | |
| B-4 | | | | | |
| B-5 | | | | | 3 |
| C-1 | | 15 | | 8 | |
| C-2 | | | | | |
| C-3 | | | | | |
| C-4 | | | | | 6 |
| Property Test: | | | | | |
| Initial strength (kg/cm$^2$) | 0.06 | 0.53 | 0.09 | 0.38 | 0.04 |
| Final bond strength | CF*6 | PS*7 | CF | PS | PS |

Note:
*6material breakage
*7surface peel

What is claimed is:

1. A moisture-curing urethane adhesive composition comprising (A) a urethane prepolymer resulting from the reaction of a mixture of a polyether diol and a polyether triol, each having a number-average molecular weight of from 1,000 to 7,000, with a diisocyanate compound in an equivalent ratio of isocyanate group to hydroxyl group of from 1.1 to 2.5; (B') a polyurethane compound resulting from the reaction of a copolymeric polyol having a number-average molecular weight of from 1,000 to 3,000 and consisting of propylene oxide and ε-caprolactone blended in a mole ratio of from 8/2 to 2/8 with a hexamethylene diisocyanate compound in an equivalent ratio of isocyanate group to hydroxyl group of from 1.5 to 2.5 to form an isocyanate prepolymer with the addition of a monoalcohol having a carbon number of from 1 to 22, the equivalent ratio of hydroxyl groups in the monoalcohol to isocyanate groups in the isocyanate prepolymer being less than 0.9; and (C) a polyurethane compound resulting from the reaction of a polyester polyol having a number-average molecular weight of from 1,000 to 7,000 with a hexamethylene diisocyanate compound in an equivalent ratio of isocyanate group to hydroxyl group of from 1.5 to 2.5 to form an isocyanate prepolymer with the addition of a monoalcohol having a carbon number of from 1 to 22, the equivalent ratio of hydroxyl groups in the monoalcohol to isocyanate groups in the isocyanate prepolymer being less than 0.9; the weight ratio of polyurethane compound (B') to polyurethane compound (C) being from 0.1:1 to 5:1, and the sum of compound (B') and compound (C) being present in an amount of from 1 to 20 parts by weight per 100 parts by weight of urethane prepolymer (A).

2. The moisture-curing urethane adhesive composition of claim 1, wherein the weight ratio of polyurethane compound (B') to polyurethane compound (C) is in the range of from 0.2:1 to 1:1.